UNITED STATES PATENT OFFICE.

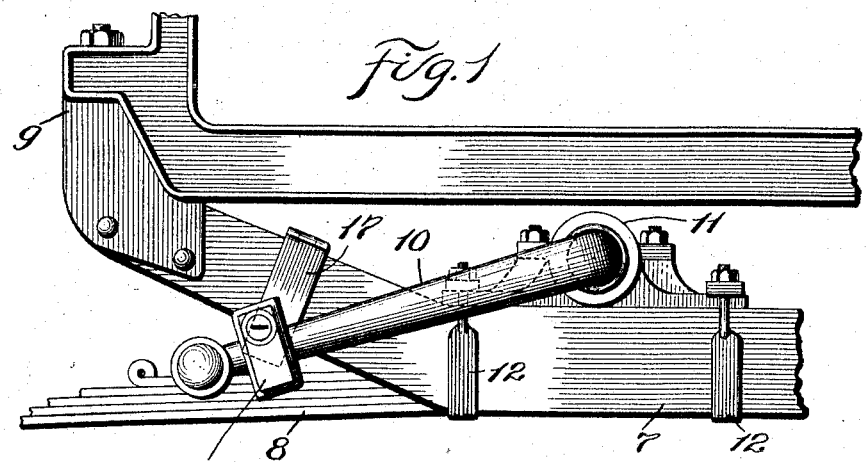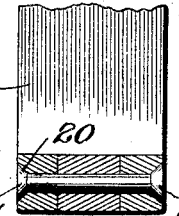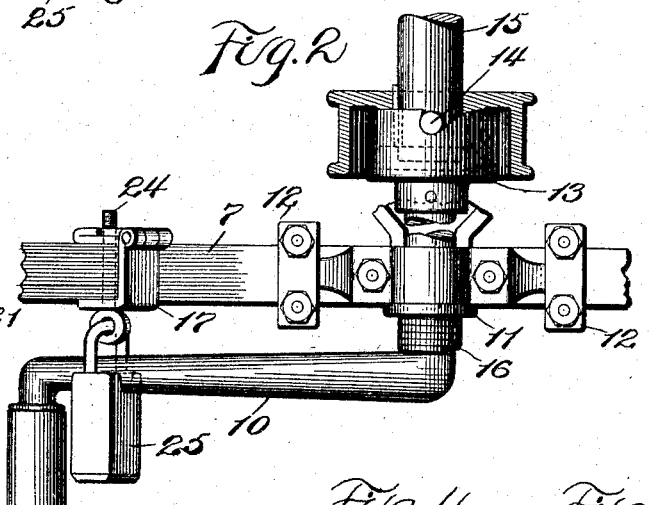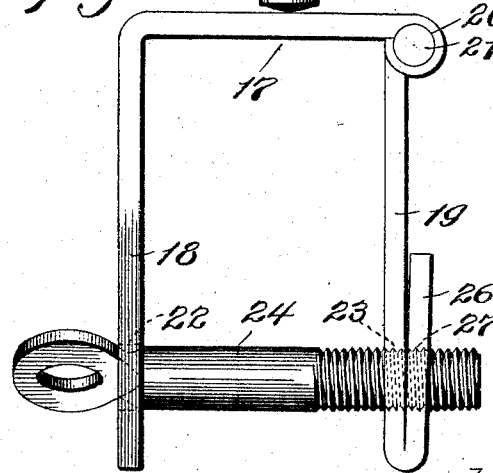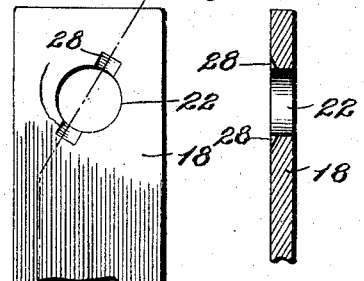

JOHN COMERFORD, OF ST. LOUIS, MISSOURI.

CRANK-LOCK FOR AUTOMOBILES.

1,300,125.

Specification of Letters Patent.  Patented Apr. 8, 1919.

Application filed September 10, 1917.  Serial No. 190,533.

*To all whom it may concern:*

Be it known that I, JOHN COMERFORD, a citizen of the United States, residing at the city of St. Louis and State of Missouri, have invented a new and useful Crank-Lock for Automobiles, of which the following is a specification.

My invention relates to improvements in crank locks for automobiles, wherein a key-crank lock, adapted to surround the engine crank, operates in conjunction with a clip, secured to a stationary part of the automobile, such as the bolster or housing for the front-axle spring, and, such lock and clip so related as to hold and lock the crank in clutched relation with the engine shaft, whereby unauthorized persons are precluded from "running" the automobile by reason of their inability to "start" the engine.

The object of my improvements is to provide a simple and inexpensive device, comprising a key operated lock, which may be readily attached to an automobile and which will effectually prevent engine "starting" and thereby "running" or "driving" of the automobile except by a person possessed of a proper key.

My invention consists in the novel construction, arrangement and combination of parts, as will be fully, clearly and concisely set forth in my specification, definitely pointed out in my claims and illustrated by the accompanying drawing, in which—

Figure 1 is a fragmentary, front elevation of an automobile, with its crank held and locked by a means embodying my improvements.

Fig. 2 is a fragmentary, plan view, partly in section, showing the crank in clutched relation with the engine shaft and locked in such relation by a device constructed in accordance with my invention.

Fig. 3 is an elevation of the clip, arranged for attachment to a fixed part of the automobile, and to which the crank may be secured, against rotation, by a key operated lock.

Fig. 4 is a fragmental elevation of the clip showing means for holding the eye-bolt in suitably set or adjusted positions.

Fig. 5 is a sectional view, taken on the line 5—5 of Fig. 4, and

Fig. 6 is a detail, fragmental, sectional view showing my preferred construction of hinge, employed in the clip.

Referring, by numerals, to the drawing 7 designates the bolster, or housing for the forward, transverse springs 8, which springs connect the front axle, not shown, with the chassis 9, shown only fragmentary in Fig. 1, and upon which bolster the crank 10 is rotatably mounted in a bearing 11, secured to the bolster by means of clips 12.

The crank, at its bearing end, carries a one-way clutch 13 adapted to co-act with a clutch-pin 14 secured, diametrically, to the engine shaft 15, and said crank and clutch are normally held to "out of clutch" position by a spring 16, whereby the engine shaft may be rotated, as when the engine is running, without effect upon the crank and clutch, and whereby the crank and clutch may be readily moved, manually into "in clutch" position relative to the engine shaft as required to "turn" the engine shaft for "starting" upon a manual rotation of the crank.

It will, at once, be obvious that if the crank is moved into clutched relation with the engine shaft and the crank locked in this position and against rotation the "starting" of the engine is precluded and the possibility of unauthorized movement of the automobile reduced to a minimum.

To this end, then, I secure to a stationary part of the automobile, at a point adjacent the free, or handle end of the crank, as it stands when the clutch is in engagement with the engine shaft, a keeper, arranged to coact with the bow, hasp or bolt of a key-operated lock, connected with the crank, to prevent rotation of the crank to start the engine, and further, to prevent operation of the engine by reason of its shaft being locked against rotation, except by an authorized person.

In the form of device, shown, which is adapted for use on a "Ford" automobile, the keeper consists of a substantially U-shaped clip, arranged to be placed over the forward bolster or spring housing 7 and positioned relative to the crank as to be inside the path of movement of the crank handle as regards the "sweep" of the crank. By preference, the clip comprises hinged sections 18 and 19 which will facilitate its placement and further, by preference, the ends of the pintle-opening 20 are countersunk and the pintle ends 21 upset or riveted wholly and bodily within the length of the pintle opening so as to render extremely difficult a dismembering of the clip for purposes of removal at times when the clip is in service and locked to the crank.

As shown in Fig. 3 the clip member 18, adjacent its free end is provided with a hole 22, and the clip member 19, adjacent its free end with a threaded opening 23, alining with the hole 22, whereby to receive an eye-bolt 24, which serves as a means for securing the clip in position, as well as a means to which the bow of the lock 25 may be secured.

By reason of the threaded connection of the eye-bolt with the clip I provide an adjustment which compensates for various crank positions, forwardly and rearwardly relative to the engine shaft and I am enabled thereby to adapt my locking means to any ordinary crank position.

By preference, and as shown in Fig. 3, the clip member 19, has an integral extension 26, formed by being bent over the body of the member and in which extension there is a threaded opening 27, produced at the time of the forming of the opening 23, after which the extension is "sprung" out of parallelism with the body of the member so that the threaded openings 23 and 27 will be relatively non-alined and their threads out of phase, to the end, that upon a turning of the threaded bolt 24 through said openings the out of phase threads will produce added friction on the bolt and thus tend to hold it to any set position against movements as may result from vibrations when the automobile is running, but which out of phase threads will not operate to prevent manual turning of the bolt.

As shown, the clip member 18 is provided with recesses 28 next its hole 22 arranged to engage the eye of the bolt and to serve as an additional means to hold the bolt against undesirable turning from adjusted position and against loss by unthreading from the clip.

Having thus described my invention what I claim as new therein and desire to secure by Letters-Patent of the United States therefor is:

1. A crank lock for automobiles, comprising a clip of substantially U-shape and perforated adjacent to each of its free ends, one of the perforations being threaded, an eye-bolt arranged for extension through the perforations and there being recesses formed in the clip in which the eye-bolt engages, at times, to hold the bolt against undesirable turning, and, a lock bodily separable from the eye-bolt and arranged to secure the crank of the automobile to the eye-bolt in order to prevent unauthorized starting and hence running of the automobile.

2. A crank lock for automobiles, comprising a U-shaped clip, provided with a perforation adjacent to each of its free ends, one of which perforations is threaded, a bolt having a threaded shank for insertion through the perforations of the clip and provided at one end with an eye, means formed integral with the clip for engagement with the bolt to prevent an undesirable turning thereof, and, a lock arranged to secure the crank of the automobile to the eye-bolt, substantially as shown and for the purposes.

JOHN COMERFORD.

Copies of this patent may be obtained for five cents each, by addressing the "Commissioner of Patents, Washington, D. C."